(12) United States Patent
Chen et al.

(10) Patent No.: US 12,519,496 B2
(45) Date of Patent: Jan. 6, 2026

(54) DEVICES, METHODS AND COMPUTER READABLE MEDIA FOR OPTIMIZING DIGITAL PREDISTORTION

(71) Applicant: NOKIA SOLUTIONS AND NETWORKS OY, Espoo (FI)

(72) Inventors: Long Chen, Zhejiang (CN); Shavantha Kularatna, Flower Mound, TX (US); Aki Heikki Jalmari Korhonen, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/709,577

(22) PCT Filed: Nov. 30, 2021

(86) PCT No.: PCT/CN2021/134461
§ 371 (c)(1),
(2) Date: May 13, 2024

(87) PCT Pub. No.: WO2023/097460
PCT Pub. Date: Jun. 8, 2023

(65) Prior Publication Data
US 2025/0007545 A1 Jan. 2, 2025

(51) Int. Cl.
*H04B 1/04* (2006.01)
(52) U.S. Cl.
CPC ... *H04B 1/0475* (2013.01); *H04B 2001/0416* (2013.01)
(58) Field of Classification Search
CPC .......... H04B 1/0475; H04B 2001/0416; H04B 2001/0425; H04B 1/04; H03F 2200/451;
(Continued)

(56) References Cited

U.S. PATENT DOCUMENTS

| 2002/0021764 A1 | 2/2002 | Posti |
| 2005/0111575 A1 | 5/2005 | Taler et al. |

(Continued)

FOREIGN PATENT DOCUMENTS

| CN | 1337088 A | 2/2002 |
| CN | 1957526 A | 5/2007 |

(Continued)

OTHER PUBLICATIONS

International Search Report and Written Opinion dated Aug. 17, 2022 corresponding to International Patent Application No. PCT/CN2021/134461.

(Continued)

*Primary Examiner* — Emmanuel Bayard
(74) *Attorney, Agent, or Firm* — SQUIRE PATTON BOGGS (US) LLP

(57) ABSTRACT

Disclosed are methods and apparatus for optimizing digital pre-distortion associated with a network device. The digital signal processing apparatus in a communication network may comprise at least one processor and at least one memory having computer program code stored thereon and configured, with the at least one processor, cause the digital signal processing apparatus as a network device to perform: splitting an input signal into two or more split signals with different frequencies, the frequency of each of said split signals being different from other said split signals; separating each of the two or more split signals into two or more component signals with different phases; and performing pre-distortion computation by using the component signals to get a pre-distorted signal to be transmitted to a power amplifier.

17 Claims, 6 Drawing Sheets

(58) Field of Classification Search
CPC ............. H03F 1/3258; H03F 2200/111; H03F 1/3241; H03F 3/189; H03F 3/24; H04L 27/368
USPC .................................................. 375/295–297
See application file for complete search history.

(56) References Cited

U.S. PATENT DOCUMENTS

| | | | |
|---|---|---|---|
| 2015/0049841 A1* | 2/2015 | Laporte | H03F 1/3241 375/297 |
| 2015/0318880 A1* | 11/2015 | Rexberg | H03F 3/24 375/297 |
| 2017/0222687 A1* | 8/2017 | Wyville | H04B 1/525 |
| 2019/0068133 A1* | 2/2019 | Gutman | H04L 27/368 |
| 2020/0186103 A1* | 6/2020 | Weber | H04L 27/368 |
| 2022/0310105 A1* | 9/2022 | Liou | H03H 17/0202 |
| 2023/0013519 A1* | 1/2023 | Wang | H04B 1/04 |

FOREIGN PATENT DOCUMENTS

| | | |
|---|---|---|
| CN | 103609018 A | 2/2014 |
| CN | 111108685 A | 5/2020 |
| EP | 2 157 692 A2 | 2/2010 |
| WO | 02/17586 A1 | 2/2002 |
| WO | 2014/092617 A1 | 6/2014 |

OTHER PUBLICATIONS

The extended European search report dated Jul. 3, 2025, in corresponding European Patent Application No. 21965902.6.

\* cited by examiner

DEVICES, METHODS AND COMPUTER READABLE MEDIA FOR OPTIMIZING DIGITAL PREDISTORTION

TECHNICAL FIELD

Various example embodiments described herein generally relate to communication technologies, and more particularly, to devices, methods, and computer readable media for hardware based optimizing digital pre-distortion with split band engines.

BACKGROUND

In new radio technology, operators of radio spectrum frequently require base station vendors to deliver radios that can transmit wider signal bandwidths compared to the last generation while maintaining the same transmit power. In some cases, more power is needed compared to the previous generation base stations. To meet such requirements, the radio vendors have to use better power amplifiers that are capable of delivering wider signal bandwidths without compromising the power output. Radio frequency (RF) improvement alone is not sufficient to satisfy spectrum emissions requirements. Often the spectrum emission requirements will not be satisfied without an improvement in digital pre-distortion (DPD) algorithms. However, there are obstacles for obtaining DPD algorithm improvements. The first obstacle is the slow pace in application specific integrated circuit (ASIC) development and its high initial costs. The complete ASIC development cycle can take several years, and this prevents designers from responding faster to customer requests. Another obstacle is that field programmable gate arrays (FPGA) are quick to develop but increasing sample rates or clock rates, necessary for improved algorithms, would necessitates the selection of larger FPGAs. Thus, there would be more costs for the base station vendors, and there would be excess heat generated in base stations.

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for a more detailed description provided below.

In a first aspect, an example embodiment of a digital signal processing apparatus in a communication network is provided. The digital signal processing apparatus may comprise at least one processor and at least one memory. At least one memory includes computer program code stored thereon. At least one memory and the computer program code may be configured to, with at least one processor, cause the digital signal processing apparatus as a network device to perform: splitting an input signal into two or more split signals with different frequencies, the frequency of each of said split signals being different from other said split signals; separating each of the two or more split signals into two or more component signals with different phases; and performing pre-distortion computation by using the component signals to get a pre-distorted signal to be transmitted to a power amplifier.

In some embodiments, splitting an input signal into two or more split signals with different frequencies comprises: shifting the input signal by a first frequency to get a first shifted signal; shifting the input signal by a second frequency to get a second shifted signal; separating the first shifted signal to get a first shifted signal with a first phase and a first shifted signal with a second phase; and separating the second shifted signal to get a second shifted signal with a third phase and a second shifted signal with a fourth phase.

In some embodiments, splitting an input signal into two or more split signals with different frequencies comprises: filtering the first shifted signal to get a first split signal; and filtering the second shifted signal to get a second split signal, wherein the first split signal is associated with the first frequency, and the second split signal is associated with the second frequency.

In some embodiments, separating each of the two or more split signals into two or more component signals with different phases further comprises: separating the first split signal into a signal by a first split with the first phase and a signal by the first split with the second phase; and separating the second split signal into a signal by a second split with the third phase and signal by the second split with the fourth phase.

In some embodiments, performing pre-distortion computation by using the component signals to get a pre-distorted signal to be transmitted to a power amplifier comprises: performing a first non-linear computation on the first shifted signal with the first phase, the signal by the first split with the first phase, the signal by the second split with the third phase, the first shifted signal with the second phase, the signal by the first split with the second phase, and the signal by the second split with the fourth phase, to get a first non-linear component; performing a second non-linear computation on the second shifted signal with the third phase, the signal by the first split with the first phase, the signal by the second split with the third phase, the second shifted signal with the fourth phase, the signal by the first split with the second phase, and the signal by the second split with the fourth phase, get a second non-linear component; subtracting the first non-linear component from the first shifted signal with the first phase to get a first output signal; subtracting the second non-linear component from the second shifted signal with the third phase to get a second output signal; and adding the first output signal and the second output signal to get the pre-distorted signal.

In some embodiments, performing pre-distortion computation by using the component signals to get a pre-distorted signal to be transmitted to a power amplifier comprises: performing a third non-linear computation associated with the first phase on the first shifted signal with the first phase, the signal by the first split with the first phase, the signal by the second split with the third phase, the first shifted signal with the second phase, the signal by the first split with the second phase, and the signal by the second split with the fourth phase, to get a third non-linear component; performing a fourth non-linear computation associated with the second phase on the first shifted signal with the first phase, the signal by the first split with the first phase, the signal by the second split with the third phase, the first shifted signal with the second phase, the signal by the first split with the second phase, and the signal by the second split with the fourth phase, to get a fourth non-linear component; performing a fifth non-linear computation associated with the first phase on the second shifted signal with the third phase, the signal by the first split with the first phase, the signal by the second split with the third phase, the second shifted signal with the fourth phase, the signal by the first split with the second phase, and the signal by the second split with the fourth phase, to get a fifth non-linear component; and performing a sixth non-linear computation associated with the second phase on the second shifted signal with the third phase, the signal by the first split with the first phase, the signal by the second split with the third phase, the second shifted signal with the fourth phase, the signal by the first split with the second phase, and the signal by the second split with the fourth phase, to get a sixth non-linear component.

In some embodiments, performing pre-distortion computation by using the component signals to get a pre-distorted signal comprises: subtracting the third non-linear component from the first shifted signal associated with the first phase to get a third output signal; subtracting the fourth non-linear component from the first shifted signal associated with the second phase to get a fourth output signal; subtracting the fifth non-linear component from the second shifted signal associated with the third phase to get a fifth output signal; subtracting the sixth non-linear component from the second shifted signal associated with the fourth phase to get a sixth output signal; adding the third output signal and the fifth output signal to obtain a first added signal; adding the fourth output signal and the sixth output signal to obtain a second added signal; and combining the first added signal and the second added signal to form the pre-distorted signal.

In some embodiments, performing pre-distortion computation by using the second component signals to get a pre-distorted signal further comprises: adding the third non-linear component and the fourth non-linear component to obtain a first added non-linear component; adding the fifth non-linear component and the sixth non-linear component to obtain a second added non-linear component; subtracting the first added non-linear component from the first shifted signal with the first phase to get a seventh output signal; subtracting the second added non-linear component from the second shifted signal with the third phase to get an eighth output signal; and adding the seventh output signal and the eighth output signal to obtain the pre-distorted signal.

In some embodiments, performing pre-distortion computation by using the component signals to get a pre-distorted signal to be transmitted to a power amplifier comprises: performing a seventh non-linear computation on the first shifted signal with the first phase, the signal by the first split with the first phase, the signal by the second split with the third phase, to get a seventh non-linear component; performing an eighth non-linear computation on the first shifted signal with the second phase, the signal by the first split with the second phase, the signal by the second split with the fourth phase, to get an eighth non-linear component; performing a ninth non-linear computation on the second shifted signal with the third phase, the signal by the first split with the first phase, the signal by the second split with the third phase, to get a ninth non-linear component; performing a tenth non-linear computation on the second shifted signal with the fourth phase, the signal by the first split with the second phase, the signal by the second split with the fourth phase, to get a tenth non-linear component; subtracting the seventh non-linear component from the first shifted signal with the first phase to get a ninth output signal; subtracting the eighth non-linear component from the first shifted signal with the second phase to get a tenth output signal; subtracting the ninth non-linear component from the second shifted signal with the third phase to get a eleventh output signal; subtracting the tenth non-linear component from the second shifted signal with the fourth phase to get a twelfth output signal; adding the ninth output signal and the tenth output signal to obtain a third added signal; adding the eleventh output signal and the twelfth output signal to obtain a fourth added signal; and combining the third added signal and the fourth added signal to form the pre-distorted signal.

In a second aspect, an example embodiment of a digital signal processing method implemented at a network device in a communication network is provided. The method may comprise: splitting an input signal into two or more split signals with different frequencies the frequency of each of said split signals being different from other said split signals; separating each of the two or more split signals into two or more component signals with different phases; and performing pre-distortion computation by using the component signals to get a pre-distorted signal to be transmitted to a power amplifier.

In some embodiments, splitting an input signal into two or more split signals with different frequencies comprises: shifting the input signal by a first frequency to get a first shifted signal; and shifting the input signal by a second frequency to get a second shifted signal; separating the first shifted signal to get a first shifted signal with the first phase and a first shifted signal with the second phase; and separating the second shifted signal to get a second shifted signal with the third phase and a second shifted signal with the fourth phase.

In some embodiments, splitting an input signal into two or more split signals with different frequencies comprises: filtering the first shifted signal to get a first split signal; and filtering the second shifted signal to get a second split signal, wherein the first split signal is associated with the first frequency, and the second split signal is associated with the second frequency.

In some embodiments, separating each of the two or more split signals into two or more component signals with different phases further comprises: separating the first split signal into a signal by a first split with the first phase and a signal by the first split with the second phase; and separating the second split signal into a signal by a second split with the third phase and signal by the second split with the fourth phase.

In some embodiments, performing pre-distortion computation by using the component signals to get a pre-distorted signal to be transmitted to a power amplifier comprises: performing a first non-linear computation on the first shifted signal with the first phase, the signal by the first split with the first phase, the signal by the second split with the third phase, the first shifted signal with the second phase, the signal by the first split with the second phase, and the signal by the second split with the fourth phase, to get a first non-linear component; performing a second non-linear computation on the second shifted signal the third phase, the signal by the first split with the first phase, the signal by the second split with the third phase, the second shifted signal with the fourth phase, the signal by the first split with the second phase, and the signal by the second split with the fourth phase, to get a second non-linear component; subtracting the first non-linear component from the first shifted signal with the first phase to get a first output signal; subtracting the second non-linear component from the second shifted signal with the third phase to get a second output signal; and adding the first output signal and the second output signal to get the pre-distorted signal.

In some embodiments, performing pre-distortion computation by using the component signals to get a pre-distorted signal to be transmitted to a power amplifier comprises: performing a third non-linear computation associated with the first phase on the first shifted signal with the first phase, the signal by the first split with the first phase, the signal by the second split with the third phase, the first shifted signal with the second phase, the signal by the first split with the second phase, and the signal by the second split with the fourth phase, to get a third non-linear component; performing a fourth non-linear computation associated with the second phase on the first shifted signal with the first phase, the signal by the first split with the first phase, the signal by the second split with the third phase, the first shifted signal with the second phase, the signal by the first split with the second phase, and the signal by the second split with the fourth phase, to get a fourth non-linear component; performing a fifth non-linear computation associated with the first phase on the second shifted signal with the third phase, the signal by the first split with the first phase, the signal by the second split with the third phase, the second shifted signal with the fourth phase, the signal by the first split with the second phase, and the signal by the second split with the fourth phase, to get a fifth non-linear component; and performing a sixth non-linear computation associated with the second phase on the second shifted signal with the third phase, the signal by the first split with the first phase, the signal by the second split with the third phase, the second shifted signal with the fourth phase, the signal by the first split with the second phase, and the signal by the second split with the fourth phase, to get a sixth non-linear component.

In some embodiments, performing pre-distortion computation by using the component signals to get a pre-distorted signal comprises: subtracting the third non-linear component from the first shifted signal associated with the first phase to get a third output signal; subtracting the fourth non-linear component from the first shifted signal associated with the second phase to get a fourth output signal; subtracting the fifth non-linear component from the second shifted signal associated with the third phase to get a fifth output signal; subtracting the sixth non-linear component from the second shifted signal associated with the fourth phase to get a sixth output signal; adding the third output signal and the fifth output signal to obtain a first added signal; adding the fourth output signal and the sixth output signal to obtain a second added signal; and combining the first added signal and the second added signal to form the pre-distorted signal.

In some embodiments, performing pre-distortion computation by using the second component signals to get a pre-distorted signal further comprises: adding the third non-linear component and the fourth non-linear component to obtain a first added non-linear component; adding the fifth non-linear component and the sixth non-linear component to obtain a second added non-linear component; subtracting the first added non-linear component from the first shifted signal with the first phase to get a seventh output signal; subtracting the second added non-linear component from the second shifted signal with the third phase to get an eighth output signal; and adding the seventh output signal and the eighth output signal to obtain the pre-distorted signal.

In some embodiments, performing pre-distortion computation by using the component signals to get a pre-distorted signal to be transmitted to a power amplifier comprises: performing a seventh non-linear computation on the first shifted signal with the first phase, the signal by the first split with the first phase, the signal by the second split with the third phase, to get a seventh non-linear component; performing an eighth non-linear computation on the first shifted signal with the second phase, the signal by the first split with the second phase, the signal by the second split with the fourth phase, to get an eighth non-linear component; performing a ninth non-linear computation on the second shifted signal with the third phase, the signal by the first split with the first phase, the signal by the second split with the third phase, to get a ninth non-linear component; performing a tenth non-linear computation on the second shifted signal with the fourth phase, the signal by the first split with the second phase, the signal by the second split with the fourth phase, to get a tenth non-linear component; subtracting the seventh non-linear component from the first shifted signal with the first phase to get a ninth output signal; subtracting the eighth non-linear component from the first shifted signal with the second phase to get a tenth output signal; subtracting the ninth non-linear component from the second shifted signal with the third phase to get a eleventh output signal; subtracting the tenth non-linear component from the second shifted signal with the fourth phase to get a twelfth output signal; adding the ninth output signal and the tenth output signal to obtain a third added signal; adding the eleventh output signal and the twelfth output signal to obtain a fourth added signal; and combining the third added signal and the fourth added signal to form the pre-distorted signal.

In a third aspect, an example embodiment of a digital signal processing apparatus in a communication network is provided. Apparatus may comprise means for splitting an input signal into two or more split signals with different frequencies, the frequency of each of said split signals being different from other said split signals; means for separating each of the two or more split signals into two or more component signals with different phases; and means for performing pre-distortion computation by using the component signals to get a pre-distorted signal to be transmitted to a power amplifier.

In a fourth aspect, an example embodiment of a computer program is provided. The computer program may comprise instructions stored on a computer readable medium. The instructions may, when executed by at least one processor of a digital signal device in a communication network, cause the digital signal device to perform: splitting an input signal into two or more split signals with different frequencies, the frequency of each of said split signals being different from other said split signals; separating each of the two or more split signals into two or more component signals with different phases; and performing pre-distortion computation by using the component signals to get a pre-distorted signal to be transmitted to a power amplifier.

Other features and advantages of the example embodiments of the present disclosure will also be apparent from the following description of specific embodiments when read in conjunction with accompanying drawings, which illustrate, by way of example, the principles of example embodiments of the present disclosure.

BRIEF DESCRIPTION OF THE DRAWINGS

Some example embodiments will now be described, by way of non-limiting examples, with reference to accompanying drawings.

Throughout the drawings, same or similar reference numbers indicate same or similar elements. A repetitive description on the same elements would be omitted.

DETAILED DESCRIPTION

Figure 1:
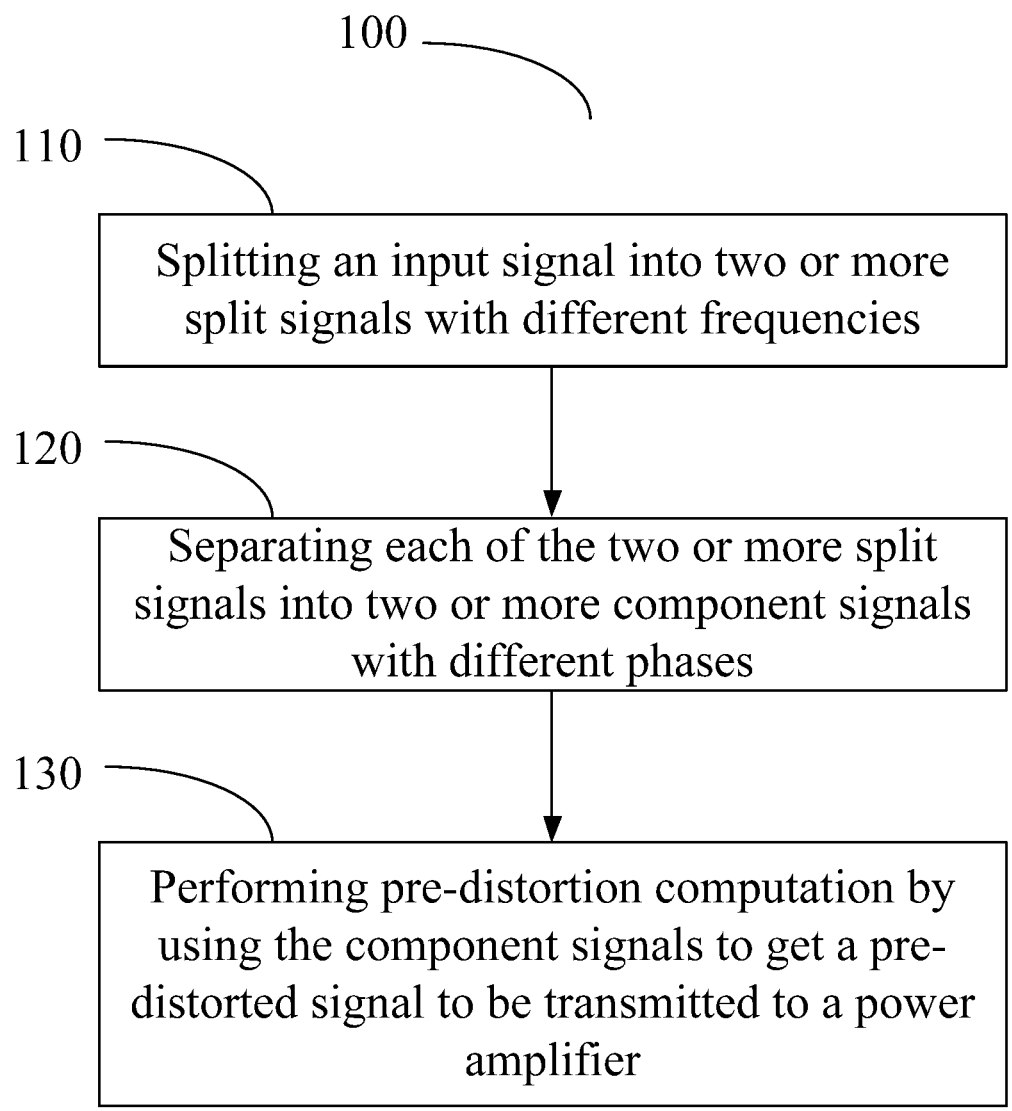
FIG. 1 shows a flow chart illustrating an example method 100 for optimizing digital pre-distortion according to an embodiment of the present disclosure.

Herein below, some example embodiments are described in detail with reference to accompanying drawings. The following description includes specific details for the purpose of providing a thorough understanding of various concepts. However, it will be apparent to those skilled in art that these concepts may be practiced without these specific details. In some instances, well known circuits, techniques and components are shown in block diagram form to avoid obscuring the described concepts and features.

The term "base station" used herein can represent a node B (NodeB or NB), an evolved node B (eNodeB or eNB), or a gNB or an ng-eNB. The base station may be embodied as a macro base station, a relay node, or a low power node such as a pico base station or a femto base station. The base station may consist of several distributed network units, such as a central unit (CU), one or more distributed units (DUs), one or more remote radio heads (RRHs) or remote radio units (RRUs). The number and functions of these distributed units depend on the selected split RAN architecture. As used herein, the term "terminal device" or "user equipment" (UE) refers to any entities or devices that can wirelessly communicate with the network devices or with each other. Examples of the terminal device can include a mobile phone, a mobile terminal, a mobile station, a subscriber station, a portable subscriber station, an access terminal, a computer, a wearable device, an on-vehicle communication device, a machine type communication (MTC) device, an internet of things (IoT) device, an internet of everything (IoE) device, a device-to-device (D2D) communication device, a vehicle to everything (V2X) communication device, a sensor and the like. The term "terminal device" can be used interchangeably with UE, a user terminal, a mobile terminal, a mobile station, or a wireless device.

As described, the legacy RF improvements may give limited improvement in emissions when wideband signals generate IMs (intermodulation products) that span 200-500 MHz, so the remaining correction may come from the improved DPD algorithms. There are several ways where the DPD algorithms can be improved to obtain better outcomes. They are: a) increasing DPD operation speed or DPD sampling rate, also known as the DPD rate; b) increasing the DPD model complexity or having higher number of DPD model coefficients; c) increasing the algorithm based degrees of freedom, for example, two independent DPD models operating in the same RF band. Sampling rate increases are limited by ASIC or the FPGA. Hence, there isn't much flexibility to that. On the other hand, the DPD model complexity or the number of model coefficients is typically fixed as well. All existing DPD algorithms maximize this already. Increasing the algorithm-based degrees of freedom is also limited by the ASIC or FPGA resources. The total hardware sources must serve multiple radio transceiver pipes as well. Hence per pipe complexity will also be limited. Thus, maximizing the DPD correction may involve using all the above features without exceeding the ASIC or the FPGA total capacity. According to the present disclosure, possible sampling rate can be maximized along with the maximum number of DPD coefficients. In addition, the extra degrees of freedoms can be combined through Dual DPD engines with distinct terms. As shown below these distinct terms also add extra degrees of freedom to the DPD algorithm.

FIG. 1 shows a flow chart illustrating an example method 100 for optimizing digital pre-distortion according to an embodiment of the present disclosure. The example method 100 may be performed at a digital signal processing apparatus in a network device on the network side. The network device may be commonly referred to as a base station or any suitable entities or devices that can provide cells or coverage, through which a terminal device can access the network or receive services.

Referring to the FIG. 1, the example digital signal processing method 100 may include a step 110 of splitting an input signal into two or more split signals with different frequencies, the frequency of each of said split signals being different from other said split signals, a step 120 of separating each of the two or more split signals into two or more component signals with different phases, and a step 130 of performing pre-distortion computation by using the component signals to get a pre-distorted signal to be transmitted to a power amplifier.

Specifically, in the step 110, an input signal may be split into two or more split signals with different frequencies. In one embodiment, when the input signal is split into two or more split signals with different frequencies, the input signal may be shifted by a first frequency to get a first shifted signal; and the input signal may also be shifted by a second frequency to get a second shifted signal. In a further embodiment, the first shifted signal may be separated to get a first shifted signal with the first phase and a first shifted signal with the second phase; and the second shifted signal may then be separated to get a second shifted signal with the third phase and a second shifted signal with the fourth phase. The first phase is different from the second phase, and the third phase is different from the fourth phase. However, the first phase may be different from or the same as the third phase, and the second phase may be different from or the same as the fourth phase. In an example, the shifted signals may be separated into polyphase component signals by a polyphase generator.

Specifically, for example, in a basic reference model, 491.52 Msps may be assumed as a Single Data Rate (SDR). Then the double of the basic rate, Dual Data Rate (DDR), is 983.04 Msps. The Dual Data Rate may consist of two basic 491.52 Msps sampling data rate (SDR) streams. The two SDR streams may interweave with a offset sample time T, Where $$T = \frac{1}{983.04 \text{ Msps}}.$$

Hence samplings between the two streams may have a resolution that is equal to 983.04 Msps. Similarly, the basic 491.52 Msps stream can be used to construct a QDR system. The Quad Data Rate may be 4*491.52 Msps, that is equal to 1966.08 Msps. In the QDR system, each 491.52 Msps sampling stream is offset by T/2

$$\left(\text{i.e. } \frac{T}{2} = \frac{1}{1966.08 \text{ Msps}}\right).$$

There may be four such streams. Samples streams may be arranged as [S1n S2n S3n S4n S1n+1 S2n+1 S3n+1 S4n+1 . . . ]. Where S3n may be the sample rate computed by the third engine with two time offsets away from S1n. Similar to that a QDR sample rate can be construct by offering a DDR sampling stream (983.03 Msps) by offsetting the second DDR stream by just $$\frac{T}{2} = \frac{1}{1966.08 \text{ Msps}}.$$

Hence for convenience, QDR structures and equations may be shown as two DDR systems with the necessary offset.

Figure 2:
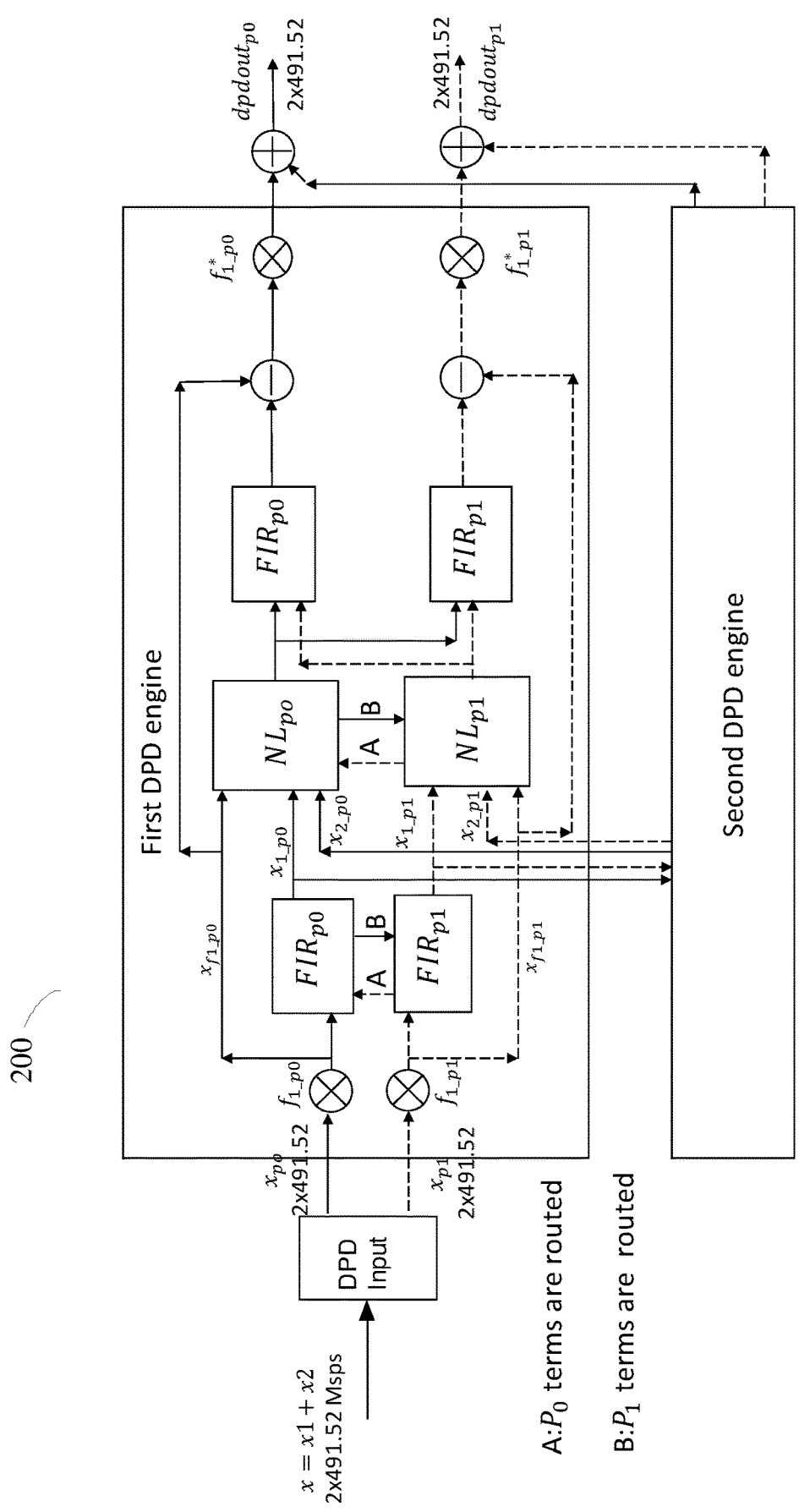
FIG. 2 shows a block diagram illustrating an example apparatus 200 for optimizing digital pre-distortion according to an embodiment of the present disclosure.

For example, FIG. 2 shows a block diagram illustrating an example apparatus 200 for optimizing digital pre-distortion according to an embodiment of the present disclosure. Referring to FIG. 2, the apparatus 200 may be associated with a network device. As illustrated in FIG. 2, the input signal has a sampling rate of 2*491.52 Msps. This input signal is then separated into two 2*491.52 Msps sampling streams that have a timing offset of $$\frac{1}{1966.08 \text{ Msps}}.$$

These streams are referred to as $P_0$ and $P_1$ phases. Both two phases are available for the two Non-Linear Engines, $NL_{p0}$ and $NL_{p1}$. The output signal of $NL_{p0}$ may be synchronized with the sampling phase $P_0$ and the output signal of $NL_{p1}$ may be synchronized with the sampling phase $P_1$. Similarly, $FIR_{p0}$ and $FIR_{p1}$ are polyphase decompositions of a filter FIR that was designed at 1966.08 Msps (QDR data rate). It should be noted, however, $FIR_{p0}$ and $FIR_{p1}$ operate at a lower sampling rate of 983.04 Msps. They still maintain the timing offsets of the $P_0$ and $P_1$ phases described above. Both filters receive signals with their corresponding phase, for example, $P_0$ for $FIR_{p0}$ directly, and the other phase, for example $P_1$ for $FIR_{p0}$. Output of the QDR engines would still maintain the respective signaling phases.

The following equations illustrate pictorial view shown in FIG. 2. A Direct learning algorithm (DLA) is used to illustrate split band QDR architecture only for illustration purpose. The concept of this disclosure, however, is not intended to be limited by the DLA architecture.

$$x_{f1\_p0} = x_{p0} * NCO(f_{1_{p0}}) \quad (1)$$

where $NCO(f_{1_{p0}})$ is a complex shift of the signal 983.04 phase 0 signal $x_{p0}$ the associated NCO frequency f1. Similarly, for signal phase 1:

$$x_{f1\_p1} = x_{p1} * NCO(f_{1_{p1}}) \quad (2)$$

In another embodiment, when the input signal is split into two or more split signals with different frequencies in the step 110, the first shifted signal may be separated to get a first shifted signal with the first phase, a first shifted signal with the second phase, a first shifted signal with the third phase, and a first shifted signal with the fourth phase; and the second shifted signal may then be separated to get a second shifted signal with the first phase, a second shifted signal with the second phase, a second shifted signal with the third phase and a second shifted signal with the fourth phase.

Specifically, for example, a QDR system can be constructed with 4 basic sampling rate systems with the necessary offset of $$\left(\frac{1}{1966.08 \text{ Msps}}\right)$$

from one input basic sampling rate. Depending on the hardware, the QDR DPD rate can be implemented with four 491.52 Msps signal processing engines. In this case, each of the signal processing engines process samples that have been offset by $$\frac{1}{1966.08 \text{ Msps}}.$$

Four such signal processing engines are required to generate a QDR DPD sample rate. Similarly, one can obtain the same result with two 983.04 Msps signal processing engines. Time offset between the two signal processing engines are $$\frac{1}{1966.08 \text{ Msps}}.$$

For simplicity, as shown FIG. 2, where QDR based split Band DPD is illustrated with two signal processing engines that operate at 983.04 Msps. One signal processing engine is allocated for each signal phase $P_0$ and $P_1$.

Then, in an embodiment, after the input signal is shifted to get a first shifted signal and a second shifted signal, the first shifted signal may then be filtered, through a split band filter for example, to get a first split signal, and the first shifted signal may then be filtered to get a second split signal.

In the step 120, each of the split signals may be separated into two or more component signals with different phases. In one embodiment, the first split signal may be separated into a signal by a first split with the first phase and a signal by the first split with the second phase; and the second split signal may be separated into a signal by a second split with the third phase and signal by the second split with the fourth phase.

For example, in one exemplary embodiment, as shown in FIG. 2, the FIRs before NL stage and after NL stage are both for band specific filtering, the difference is one is applied on DPD input signal and another one is applied on pre-distortion signal. Depending on how many poly-phases are in use, each FIR consists of two or more sub-FIR, one for each ploy-phase, namely FIRpx, where x stands for poly-phase index. The two FIRs of two adjacent bands are complementary in frequency, their combination (by summing the outputs of two FIRs) is supporting a total bandwidth covering both band1 and band2.

Specifically, in the example embodiment as shown in FIG. 2, an input signal cab be split into two bands, via a numerally controlled oscillator (NCO) shift and filtering for example. Specifically, band 1 may be represented with signal $x_1$ and band 2 may be represented with signal $x_2$. Both signals may add up to $x=(x_1+x_2)$. It adds extra degrees by introducing two independent DPD engines working in a mutually exclusive fashion. That is, the signal x is split into two different bands. Band 1 signal components and Band 2 components. Two pre-distorted signals are generated by the two engines. They are then added after shifting back to base band to generate just one pre-distortion signal. Added signal is then converted to analog domain by converters (not shown).

Equations shown below describe the Split Band QDR operation. The signal x is broken into $x_1$ and $x_2$ components. $x_1$ is extracted in the first DPD engine shown in FIG. 2 $x_2$ is extracted in the second DPD engine shown in FIG. 2. Equations for the second DPD engine is similar to the equations for the first DPD engine and repetitive descriptions thereof are omitted here.

$$x_{1\_p0} = FIR_{p0}(x_{f1\_p0}, x_{f1\_p1}) \quad (3)$$

$$x_{1\_p1} = FIR_{p1}(x_{f1\_p1}, x_{f1\_p0}) \quad (4)$$

It should be noted that both phases $x_{f1\_p0}$ and $x_{f1\_p1}$ are required to generate a filtered output $x_{1\_p0}$. Alternate phases are routed to each filtering entity through interfaces A and B. $FIR_{p0}$ is constructed from extracting two polyphase filter coefficients for a filter designed to operate at 1966.08 Msps. Polyphase filter components operate at 983.04 Msps respectively.

Then, in the step 130, pre-distortion computation may be performed by using the component signals to get a pre-distorted signal to be transmitted to a power amplifier. In an embodiment, the step of performing pre-distortion computation by using the component signals to get a pre-distorted signal to be transmitted to a power amplifier may comprise: performing a third non-linear computation associated with the first phase on the first shifted signal with the first phase, the signal by the first split with the first phase, the signal by the second split with the third phase, the first shifted signal with the second phase, the signal by the first split with the second phase, and the signal by the second split with the fourth phase, to get a third non-linear component; performing a fourth non-linear computation associated with the second phase on the first shifted signal with the first phase, the signal by the first split with the first phase, the signal by the second split with the third phase, the first shifted signal with the second phase, the signal by the first split with the second phase, and the signal by the second split with the fourth phase, to get a fourth non-linear component; performing a fifth non-linear computation associated with the first phase on the second shifted signal with the third phase, the signal by the first split with the first phase, the signal by the second split with the third phase, the second shifted signal with the fourth phase, the signal by the first split with the second phase, and the signal by the second split with the fourth phase, to get a fifth non-linear component; and performing a sixth non-linear computation associated with the second phase on the second shifted signal with the third phase, the signal by the first split with the first phase, the signal by the second split with the third phase, the second shifted signal with the fourth phase, the signal by the first split with the second phase, and the signal by the second split with the fourth phase, to get a sixth non-linear component.

Then the step 130 of performing pre-distortion computation by using the component signals to get a pre-distorted signal to be transmitted to a power amplifier may further comprise: subtracting the third non-linear component from the first shifted signal associated with the third phase to get a third output signal; subtracting the fourth non-linear component from the first shifted signal associated with the fourth phase to get a fourth output signal; subtracting the fifth non-linear component from the second shifted signal associated with the first phase to get a fifth output signal; subtracting the sixth non-linear component from the second shifted signal associated with the second phase to get a sixth output signal; adding the third output signal and the fifth output signal to obtain a first added signal; adding the fourth output signal and the sixth output signal to obtain a second added signal; and combining the first added signal and the second added signal to form the pre-distorted signal.

For example, as shown in FIG. 2, at the output of the $NL_{p0}$ engine, the phase 0 signal may be written as:

$$x_{NL\_p0} = \overline{NL_{p0}(x_{f1\_p0}, x_{1\_p0}, x_{2\_p0}, x_{f1\_p1}, x_{1\_p1}, x_{2\_p1})} * \overline{C_{p0}} \quad (5)$$

It should be noted that the $\overline{NL_{p0}}$ vector requires both phases of the 3 signal components (composite x, $x_1$ and $x_2$). $\overline{C_{p0}}$ is the DPD coefficient vector associated with the $\overline{NL_{p0}}$ and signal phase 0.

Similarly, the output of engine phase 1 signal may be written as:

$$x_{NL\_p1} = \overline{NL_{p1}(x_{f1\_p1}, x_{1\_p1}, x_{2\_p1}, x_{f1\_p0}, x_{1\_p0}, x_{2\_p0})} * \overline{C_{p1}} \quad (6)$$

$$dpdout_{p0}(n) = \quad (7)$$
$$NCO(f1^*_{p0})(x_{f1\_p0}(n) - FIR_{p0}(x_{NL_{p0}}, x_{NL_{p1}})) + x_{2\_dpd\_baseband\_p0}$$

Where $dpdout_{p0}$ is the phase 0 DPD output signal at base band at a sample rate of 983.04 Msps. It consists of phase 0 DPD output signals from both DPD engines. That is, it consists of phase 0 DPD outputs of both band 1 and band 2 components. $x_{2\_dpd\_baseband\_p0}$ shown above is the band 2 specific phase 0 DPD output signal.

As described above $FIR_{p0}$ is the phase 0 filtering. It takes both phases as input.

$$dpdout_{p1}(n) = \quad (8)$$
$$NCO(f1^*_{p1})(x_{f1\_p1}(n) - FIR_{p1}(x_{NL_{p1}}, x_{NL_{p0}})) + x_{1\_dpd\_baseband\_p1}$$

In another embodiment, the step 130 of performing pre-distortion computation by using the component signals to get a pre-distorted signal to be transmitted to a power amplifier may comprise: performing a third non-linear computation associated with the first phase on the first shifted signal with the first phase, the signal by the first split with the first phase, the signal by the second split with the third phase, the first shifted signal with the second phase, the signal by the first split with the second phase, and the signal by the second split with the fourth phase, to get a third non-linear component; performing a fourth non-linear computation associated with the second phase on the first shifted signal with the first phase, the signal by the first split with the first phase, the signal by the second split with the third phase, the first shifted signal with the second phase, the signal by the first split with the second phase, and the signal by the second split with the fourth phase, to get a fourth non-linear component; performing a fifth non-linear computation associated with the first phase on the second shifted signal with the third phase, the signal by the first split with the first phase, the signal by the second split with the third phase, the second shifted signal with the fourth phase, the signal by the first split with the second phase, and the signal by the second split with the fourth phase, to get a fifth non-linear component; and performing a sixth non-linear computation associated with the second phase on the second shifted signal with the third phase, the signal by the first split with the first phase, the signal by the second split with the third phase, the second shifted signal with the fourth phase, the signal by the first split with the second phase, and the signal by the second split with the fourth phase, to get a sixth non-linear component.

Then the step 130 of performing pre-distortion computation by using the component signals to get a pre-distorted signal to be transmitted to a power amplifier may further comprise: adding the third non-linear component and the fourth non-linear component to obtain a first added non-linear component; adding the fifth non-linear component and the sixth non-linear component to obtain a second added non-linear component; subtracting the first added non-linear component from the first shifted signal with the first phase to get a seventh output signal; subtracting the second added non-linear component from the second shifted signal with the third phase to get an eighth output signal; adding the seventh output signal and the eighth output signal to obtain the pre-distorted signal.

Figure 3:
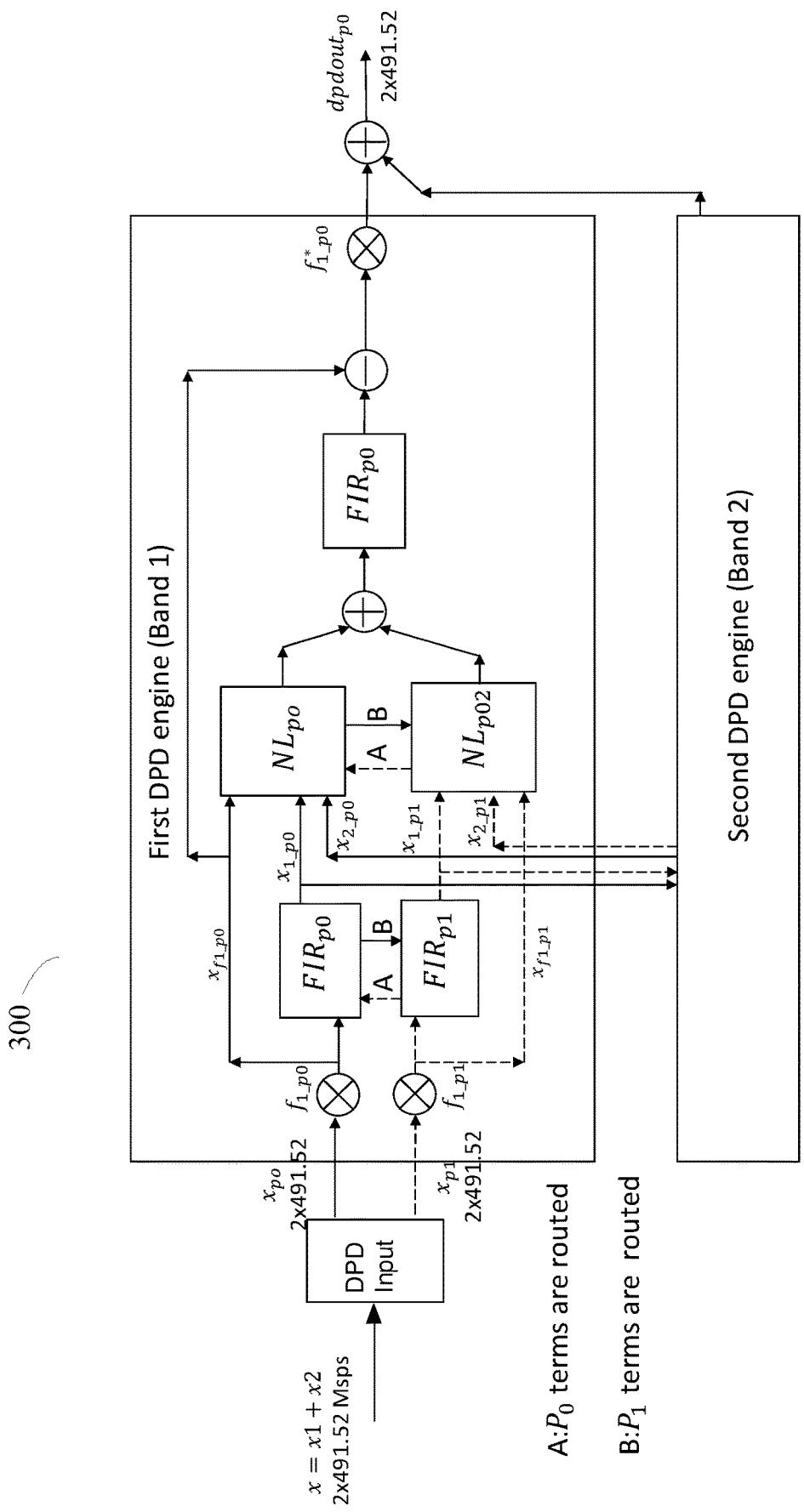
FIG. 3 shows a block diagram illustrating an example apparatus 300 for optimizing digital pre-distortion according to an embodiment of the present disclosure.

For example, FIG. 3 shows a block diagram illustrating an example apparatus 300 for optimizing digital pre-distortion according to an embodiment of the present disclosure. Referring to FIG. 3, the apparatus 300 may be associated with a network device. Although the Split band DPD with QDR solution as shown in FIG. 2 has good performance, it consumes a lot of ASIC or FPGA resources. The DPD solutions shown in FIG. 3 or FIG. 4 may need much less ASIC or FPGA resources but do not have significant loss of adjacent channel leakage ratio (ACLR) performance. These architectures may fit a smaller hardware footprint, thus inexpensive from ASIC and FPGA point of view.

As shown in FIG. 3, only signal phase $P_0$ is produced, and signal phase $P_1$ is omitted. Therefore, the architecture is much simpler and the output signal rate is only 983.04 Msps. Compared with the QDR architecture in FIG. 2, however, the solution in FIG. 3 still utilizes a QDR sampling rate at the DPD input. This will preserve the modelling accuracy of the of the solution. Moreover, there are no timing rules when forming the output phase 0 signal. In an ideal Split Band QDR architecture output Phase 0 signal is formed when input signals $x_{p0}$ and $x_{p1}$ are 0.5 samples off. See the following equation where NL stands for a Nonlinear term. $y_{p0}=NL(x_{p0}(n), x_{p1}(n-0.5))$. Similarly phase 1 signal is formed with input timing offsets of 0.5 and 1.0 etc. For example, in FIG. 2, $y_{p1}=NL(x_{p0}(n-0.5), x_{p1}(n-1.0))$. Non-linear engines $NL_{p0}$ and $NL_{p1}$ of the architectures in FIG. 3 and FIG. 4 may be free from having to follow such rules. Hence, a phase 0 non-linear term can be expressed as $y_{p0}=NL(x_{p0}(n1), x_{p1}(n2))$. Where n1 and n2 are random or optimized timing offsets designed to improve performance. Additionally, nonlinear terms are formulated with 6 inputs to maximize the degrees of freedom. They are: the shifted composites $x_{f1\_p0}$ and $x_{f1\_p1}$ and the extracted band 1 and band 2 signal phases $x_{1\_p0}$, $x_{1\_p1}$, $x_{2\_p0}$, $x_{2\_p1}$. An example nonlinear term, although not limited only to this, may be written for band 1 as follows:

$$x_{aPx}(n-k1) * x_{bPx}(n-k2) * x_{cPx}^*(n-k3) * NL(p(n-k4)),$$

where $x_a$ can be either $x_{f1}$ (shifted composite) or $x_1$; $P_x$ can be $P_0$ or $P_1$ (phase 0 or phase 1 signals); k1, k2, k3 and k4 are random or optimized time shifts; $x_b$ can be either $x_1$, $x_2$ or 1.0; $x_c^*$ can be either conjugates of $x_{aPx}$, $x_{bPx}$ or it can be 1.0. p can be modulus of $x_{aPx}$, $x_{bPx}$, $x_{cPx}$ or $(|x_{1Px}|^1+|x_{2Px}|^1)$ or $(|x_{1Px}|^2+|x_{2Px}|^2)$.

In one example embodiment, band 2 signal can be formulated in a similar fashion as well. Non-linear terms specified here are general. However, one could obtain decent results by omitting signal components $x_1$ and $x_2$ and keeping only the shifted composites. That is, there may be only $x_{f1\_p0}$ and $x_{f1\_p1}$ for band 1. It should be noted that $x_{f1\_p1}$ gets routed via interface A.

As illustrated in FIG. 2 and FIG. 3, the solution in FIG. 3 is simplified compared with the solution in FIG. 2. In the solution of FIG. 3, only one output filter is required ($FIR_{p0}$) at the output of non-linear hardware blocks. That, too, is at a reduced sample rate of 983.04 Msps. Thus, avoiding an additional polyphase filtering as shown in FIG. 2. A single NCO is required to shift the signal back to base band, as compared with the solution of FIG. 2 where two NCOs are required in the architecture shown in FIG. 2.

The solutions in FIG. 3 share all the equations from (1) through (5). It should be noted that the non-linear entities $NL_{po}$ and $NL_{p02}$ don't produce Phase 1 signals. The above description can be followed on how non-linear terms can be generated. The DPD output in FIG. 3 can be described as follows:

$$x_{NL\_p02} = \overline{NL_{p02}(x_{f1\_p1}, x_{1\_p1}, x_{2\_p1}, x_{f1\_p0}, x_{1\_p0}, x_{2\_p0}) * C_{p02}} \quad (9)$$

$$dpdout_{p0}(n) = \quad (10)$$
$$NCO\left(f_{1_{p0}}^*\right)\left(x_{f1_{p0}}(n) - FIR_{p0}(x_{NL_{p0}} + x_{NL_{p02}})\right) + x_{2\_dpd\_baseband\_p0}$$

Where $x_{2\_dpd\_baseband\_p0}$ is the band 2 DPD output signal pertaining to phase 0.

The ACLR results of the solution in FIG. 3 are comparable with a minimum loss to the ACLR results of the Split Band DPD with QDR architecture shown in FIG. 2.

In another embodiment, the step 130 of performing pre-distortion computation by using the component signals to get a pre-distorted signal to be transmitted to a power amplifier may comprise: performing a first non-linear computation on the first shifted signal with the first phase, the signal by the first split with the first phase, the signal by the second split with the third phase, the first shifted signal with the second phase, the signal by the first split with the second phase, and the signal by the second split with the fourth phase, to get a first non-linear component; performing a second non-linear computation on the second shifted signal the third phase, the signal by the first split with the first phase, the signal by the second split with the third phase, the second shifted signal with the fourth phase, the signal by the first split with the second phase, and the signal by the second split with the fourth phase, to get a second non-linear component; subtracting the first non-linear component from the first shifted signal with the first phase to get a first output signal; subtracting the second non-linear component from the second shifted signal with the third phase to get a second output signal; and adding the first output signal and the second output signal to get the pre-distorted signal.

Figure 4:
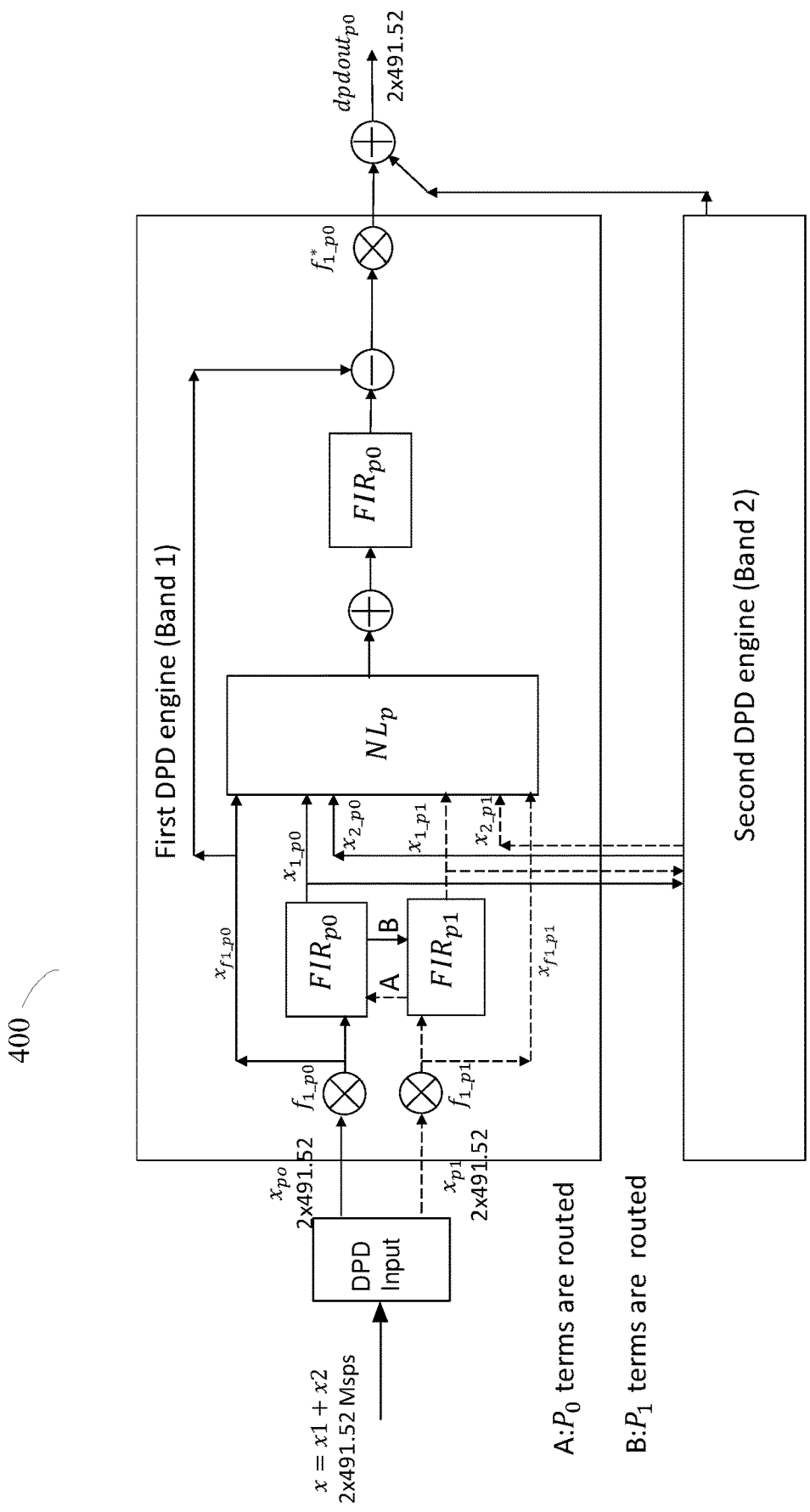
FIG. 4 shows a block diagram illustrating an example apparatus 400 for optimizing digital pre-distortion according to an embodiment of the present disclosure.

For example, FIG. 4 shows a block diagram illustrating an example apparatus 400 for optimizing digital pre-distortion according to an embodiment of the present disclosure. Referring to the FIG. 4, the apparatus 400 may be associated with a network device. FIG. 4 shows a further simplification of the architecture shown in FIG. 3. In FIG. 4, only a single non-linear hardware block $NL_p$ handles the computations of $NL_{po}$ and $NL_{po2}$ shown in FIG. 3. The solution in FIG. 4 also shares all the equations from (1) through (4). It should be noted that the non-linear entity $NL_p$ also doesn't produce phase 1 signals. Follow the above description on how non-linear terms can be generated. DPD output can be described as follows:

$$x_{NL\_p} = \overline{NL_p\ (x_{f1\_p1}, x_{1\_p1}, x_{2\_p1}, x_{f1\_p0}, x_{1\_p0}, x_{2\_p0}) * C_{p0}} \quad (11)$$

$$dpdout_{p0}(n) = NCO\left(f_{1_{p0}}^*\right)\left(x_{f1_{p0}}(n) - FIR_{p0}(x_{NL_p})\right) + x_{2\_dpd\_baseband\_p0} \quad (12)$$

Where $x_{2\_dpd\_baseband\_p0}$ is the band 2 DPD output signal pertaining to phase 0.

The ACLR results of this solution shown in FIG. 4 are comparable with a minimum loss to that of the ideal Split Band DPD with QDR architecture shown in FIG. 2.

In another embodiment, the step 130 of performing pre-distortion computation by using the component signals to get a pre-distorted signal to be transmitted to a power amplifier may comprise: performing a seventh non-linear computation on the first shifted signal with the first phase, the signal by the first split with the first phase, the signal by the second split with the third phase, to get a seventh non-linear component; performing an eighth non-linear computation on the first shifted signal with the second phase, the signal by the first split with the second phase, the signal by the second split with the fourth phase, to get an eighth non-linear component; performing a ninth non-linear computation on the second shifted signal with the third phase, the signal by the first split with the first phase, the signal by the second split with the third phase, to get a ninth non-linear component; performing a tenth non-linear computation on the second shifted signal with the fourth phase, the signal by the first split with the second phase, the signal by the second split with the fourth phase to get a ninth output signal; subtracting the eighth non-linear component from the first shifted signal with the second phase to get a tenth output signal; subtracting the ninth non-linear component from the second shifted signal with the third phase to get a eleventh output signal; subtracting the tenth non-linear component from the second shifted signal with the fourth phase to get a twelfth output signal; adding the ninth output signal and the tenth output signal to obtain a third added signal; adding the eleventh output signal and the twelfth output signal to obtain a fourth added signal; and combining the third added signal and the fourth added signal to form the pre-distorted signal. For example, FIG. 5 shows a block diagram illustrating an example apparatus 500 for optimizing digital pre-distortion according to an embodiment of the present disclosure.

Figure 5:
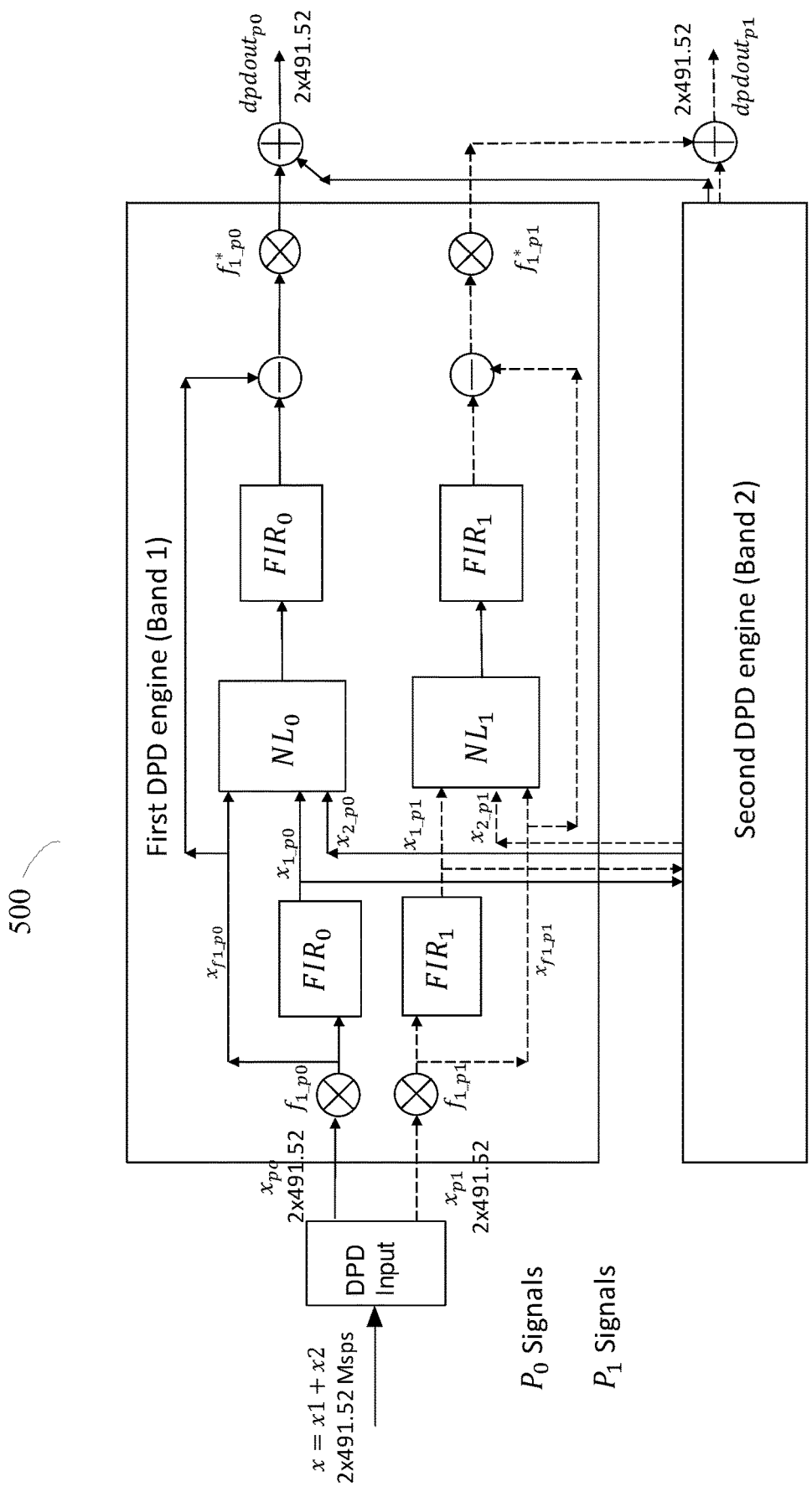
FIG. 5 shows a block diagram illustrating an example apparatus 500 for optimizing digital pre-distortion according to an embodiment of the present disclosure.

Referring to the FIG. 5, in the First DPD engine, a seventh non-linear computation may be performed by $NL_0$, before filtered by a split band filter $FIR_0$ so as to obtain a seventh non-linear component. An eighth non-linear computation may be performed by $NL_1$, before filtered by a split band filter $FIR_1$ so as to obtain an eighth non-linear component. Similarly, a ninth non-linear computation and a tenth non-linear computation may be performed by modules (not shown) in the second DPD engine to obtain a ninth non-linear component and a tenth non-linear component.

Specifically, the apparatus 500 may be associated with a network device, where a separate set of simplifications were used to improve ACLR results of the DPD performance. Compared with the QDR architecture in FIG. 2, the DPD solution shown in FIG. 5 is built with significantly lower filtering requirements (or multipliers in general). $FIR_0$ shown in FIG. 5 takes only one signal phase, namely phase 0. The same filter is used at the output of $NL_0$ as well. Both Split Band DPD with QDR and Split band DPD uses both signal phases in FIR filtering. In such case filtering to produce phase 0 signal requires both polyphase coefficients. Hence the solution in FIG. 5 requires half as much filtering resources. The same resource savings are obtained for $FIR_1$ as well. As shown in FIG. 5, $FIR_0$ may use the 32-tap polyphase 0 filtering coefficients, whereas $FIR_1$ may use the remaining 32 tap polyphase filter coefficients associated with phase 1. Both polyphase coefficients are extracted from a single filter FIR designed at 1966.08 Msps. $FIR_0$ and $FIR_1$ operate at 983.04 Msps. The above tap numbers are given as examples only.

In an alternative approach a common 32 tap $FIR_{common}$ filter can be used in all the filters replacing the polyphase coefficients. Such a filter is then designed at a sampling rate of 983.04 Msps, which is the same rate as Phase 0 or Phase 1 signal. When properly designed, the common filter can be $FIR_0$ as well. In this case then $FIR_1$ may be equal to $FIR_0$, and only Phase 0 polyphase coefficients are used. It operates at 983.04 Msps.

As shown in FIG. 5, $FIR_0$, $NL_0$, and $FIR_0$ operate purely on Phase 0, and Phase 0 signal stream operates independently from signal Phase 1, as compared with FIG. 2 for the difference. The same is true with Phase 1 as well. DPD output rate is QDR (1966.08 Msp). Thus, there is additional capability to increase the pre-distortion bandwidth. A summary of Split Band DPD with QDR shown in FIG. 5 is as follows.

$$x_{f1\_p0} = x_{p0} * NCO\left(f_{1_{p0}}\right) \quad (13)$$

where $NCO(f_{1_{p0}})$ introduces a complex shift to signal by $x_{p0}$. the associated NCO frequency is $f_{1_{p0}}$.

Similarly, for signal phase 1:

$$x_{f1\_p1} = x_{p1} * NCO\left(f_{1_{p1}}\right) \quad (14)$$

The composite signal is then broken into $x_1$ and $x_2$ components. $x_2$ is extracted in the second DPD engine shown in FIG. 5. Equations for the second engine is self-evident and similar to equations of the first engine and repetitive descriptions thereof are omitted here.

$$x_{1\_p0} = FIR_0(x_{f1\_p0}) \quad (15)$$

It should be noted that only a phase $x_{f1\_p0}$ is used to generate a filtered output $x_{1\_p0}$. Note that coefficients for $FIR_{p0}$ are obtained from polyphase filter design at 1966.08 Msps. Only Phase 0 coefficients are used for $FIR_{p0}$. Filter $FIR_{p0}$ operates at 983.04 Msps. Note a common filter can also be used disregarding the polyphase approach, as described above.

$$x_{1\_p1} = FIR_1(x_{f1\_p1}) \quad (16)$$

At the output of the $NL_{p0}$ engine, a phase 0 signal may be written as:

$$x_{NL\_p0} = \overline{NL_0}\ (x_{f1\_p0}, x_{1\_p0}, x_{2\_p0}) * \overline{C_{p0}}) \quad (17)$$

It should be noted that $\overline{NL_0}$ vector requires only phases 0 components of the 3 signals (composite x, $x_1$ and $x_2$). A basic description of the non-linear components was illustrated above with respective to the solution in FIG. 3. $\overline{C_{p0}}$ is the DPD coefficient vector associated with $\overline{NL_0}$ and signal phase 0.

Similarly, the output of NL engine phase 1 may be written as:

$$x_{NL\_p1} = \overline{NL_1}\ (x_{f1\_p1}, x_{1\_p1}, x_{2\_p1}) * \overline{C_{p1}}) \quad (18)$$

$$dpdout_{p0}(n) = NCO\left(f^*_{1_{p0}}\right)\left(x_{f1_{p0}}(n) - FIR_0(x_{NL_0})\right) + x_{2\_dpd\_baseband\_p0} \quad (27)$$

It should be noted only a single-phase signal $x_{NL_0}$ is used as the input to filter $FIR_0$. A common filter can also be used, disregarding the polyphase approach, as described above.

$$dpdout_{p1}(n) = NCO\left(f^*_{1_{p1}}\right)\left(x_{f1_{p1}}(n) - FIR_1(x_{NL_1})\right) + x_{2\_dpd\_baseband\_p1} \quad (28)$$

$x_{NL_1}$ is the output from $NL_1$.

The simulated linearization results obtained for the solution shown in FIG. 5 demonstrate that the performance of the solution is almost as good as the solution in FIG. 2.

Although the example embodiments disclosed herein are applied to bands 1 and 2, the example embodiments are only for illustration purpose and are not intended to limit the scope of this disclosure. The present disclosure can also be applied to 3, 4 or more bands. For example, a 3-band system may consist of 3 signal processing engines. Each of them may operate at a QDR rate. The only difference then may be that of composite signal x where it may be broken down to $x_1$, $x_2$ and $x_3$. Hence, the number of inputs may increase per each signal processing engine. The designer may omit some terms to keep the number of inputs low. That may keep the non-linear processing engine simple, which still fall within the scope of the present disclosure. In an example embodiment, as a minimum the composite terms may be essential at each signal processing engine.

Figure 6:
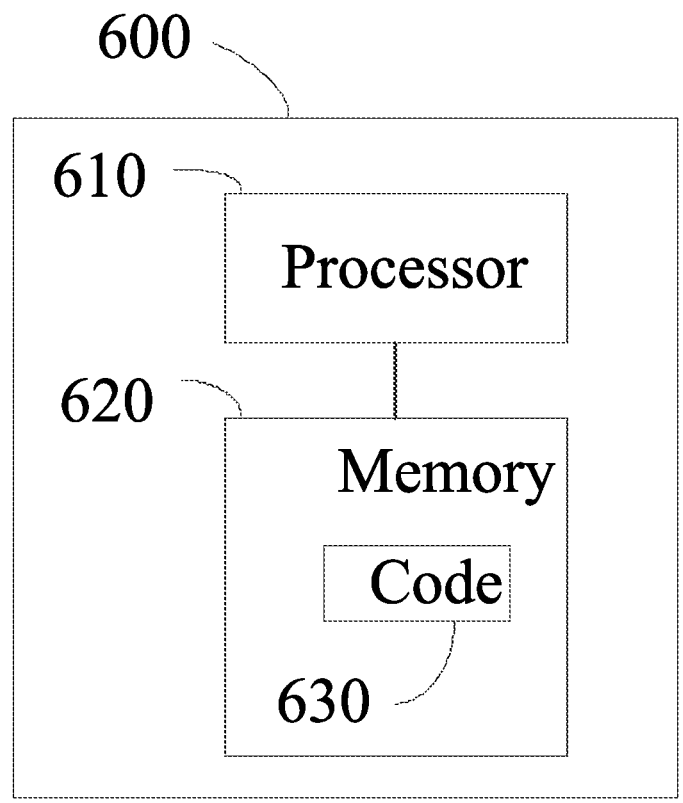
FIG. 6 shows a block diagram illustrating an example apparatus 600 for optimizing digital pre-distortion in which example embodiments of the present disclosure can be implemented.

FIG. 6 shows a block diagram illustrating an example apparatus 600 for optimizing digital pre-distortion in which example embodiments of the present disclosure can be implemented. The apparatus, for example, may be at least part of the network device in the above examples.

As shown in the FIG. 6, the example apparatus 600 may include at least one processor 610 and at least one memory 620 that may include computer program code 630. The at least one memory 620 and the computer program code 630 may be configured to, with the at least one processor 610, cause the apparatus 600 at least to perform at least one of the example method 700 described above.

In various example embodiments, the at least one processor 610 in the example apparatus 600 may include, but not limited to, at least one hardware processor, including at least one microprocessor such as a central processing unit (CPU), a portion of at least one hardware processor, and any other suitable dedicated processor such as those developed based on for example Field Programmable Gate Array (FPGA) and Application Specific Integrated Circuit (ASIC). Further, the at least one processor 610 may also include at least one other circuitry or element not shown in the FIG. 6.

In various example embodiments, the at least one memory 620 in the example apparatus 600 may include at least one storage medium in various forms, such as a volatile memory and/or a non-volatile memory. The volatile memory may include, but not limited to, for example, a random-access memory (RAM), a cache, and so on. The non-volatile memory may include, but not limited to, for example, a read only memory (ROM), a hard disk, a flash memory, and so on. Further, the at least memory 620 may include, but are not limited to, an electric, a magnetic, an optical, an electromagnetic, an infrared, or a semiconductor system, apparatus, or device or any combination of the above.

Further, in various example embodiments, the example apparatus 600 may also include at least one other circuitry, element, and interface, for example at least one I/O interface, at least one antenna element, and the like.

In various example embodiments, the circuitries, parts, elements, and interfaces in the example digital signal processing apparatus 600, including the at least one processor 610 and the at least one memory 620, may be coupled together via any suitable connections including, but not limited to, buses, crossbars, wiring and/or wireless lines, in any suitable ways, for example electrically, magnetically, optically, electromagnetically, and the like.

It is appreciated that the structure of the apparatus on the side of the network apparatus is not limited to the above example apparatus 600.

At least one memory 620 and the computer program code 630 may be configured to, with at least one processor 620, cause the digital signal processing apparatus 600 as a network device to perform: splitting an input signal into two or more split signals with different frequencies, the frequency of each of said split signals being different from other said split signals; separating each of the two or more split signals into two or more component signals with different phases; and performing pre-distortion computation by using the component signals to get a pre-distorted signal to be transmitted to a power amplifier.

In an embodiment, splitting an input signal into two or more split signals with different frequencies comprises: shifting the input signal by a first frequency to get a first shifted signal; shifting the input signal by a second frequency to get a second shifted signal; separating the first shifted signal to get a first shifted signal with a first phase and a first shifted signal with a second phase; and separating the second shifted signal to get a second shifted signal with a third phase and a second shifted signal with a fourth phase.

In an embodiment, splitting an input signal into two or more split signals with different frequencies comprises: filtering the first shifted signal to get a first split signal; and filtering the second shifted signal to get a second split signal, wherein the first split signal is associated with the first frequency, and the second split signal is associated with the second frequency.

In an embodiment, separating each of the two or more split signals into two or more component signals with different phases further comprises: separating the first split signal into a signal by a first split with the first phase and a signal by the first split with the second phase; and separating the second split signal into a signal by a second split with the third phase and signal by the second split with the fourth phase.

In an embodiment, performing pre-distortion computation by using the component signals to get a pre-distorted signal to be transmitted to a power amplifier comprises: performing a first non-linear computation on the first shifted signal with the first phase, the signal by the first split with the first phase, the signal by the second split with the third phase, the first shifted signal with the second phase, the signal by the first split with the second phase, and the signal by the second split with the fourth phase, to get a first non-linear component; performing a second non-linear computation on the second shifted signal with the third phase, the signal by the first split with the first phase, the signal by the second split with the third phase, the second shifted signal with the fourth phase, the signal by the first split with the second phase, and the signal by the second split with the fourth phase, get a second non-linear component; subtracting the first non-linear component from the first shifted signal with the first phase to get a first output signal; subtracting the second non-linear component from the second shifted signal with the third phase to get a second output signal; and adding the first output signal and the second output signal to get the pre-distorted signal.

In an embodiment, performing pre-distortion computation by using the component signals to get a pre-distorted signal to be transmitted to a power amplifier comprises: performing a third non-linear computation associated with the first phase on the first shifted signal with the first phase, the signal by the first split with the first phase, the signal by the second split with the third phase, the first shifted signal with the second phase, the signal by the first split with the second phase, and the signal by the second split with the fourth phase, to get a third non-linear component; performing a fourth non-linear computation associated with the second phase on the first shifted signal with the first phase, the signal by the first split with the first phase, the signal by the second split with the third phase, the first shifted signal with the second phase, the signal by the first split with the second phase, and the signal by the second split with the fourth phase, to get a fourth non-linear component; performing a fifth non-linear computation associated with the first phase on the second shifted signal with the third phase, the signal by the first split with the first phase, the signal by the second split with the third phase, the second shifted signal with the fourth phase, the signal by the first split with the second phase, and the signal by the second split with the fourth phase, to get a fifth non-linear component; and performing a sixth non-linear computation associated with the second phase on the second shifted signal with the third phase, the signal by the first split with the first phase, the signal by the second split with the third phase, the second shifted signal with the fourth phase, the signal by the first split with the second phase, and the signal by the second split with the fourth phase, to get a sixth non-linear component.

In an embodiment, performing pre-distortion computation by using the component signals to get a pre-distorted signal comprises: subtracting the third non-linear component from the first shifted signal associated with the first phase to get a third output signal; subtracting the fourth non-linear component from the first shifted signal associated with the second phase to get a fourth output signal; subtracting the fifth non-linear component from the second shifted signal associated with the third phase to get a fifth output signal; subtracting the sixth non-linear component from the second shifted signal associated with the fourth phase to get a sixth output signal; adding the third output signal and the fifth output signal to obtain a first added signal; adding the fourth output signal and the sixth output signal to obtain a second added signal; and combining the first added signal and the second added signal to form the pre-distorted signal.

In an embodiment, performing pre-distortion computation by using the second component signals to get a pre-distorted signal further comprises: adding the third non-linear component and the fourth non-linear component to obtain a first added non-linear component; adding the fifth non-linear component and the sixth non-linear component to obtain a second added non-linear component; subtracting the first added non-linear component from the first shifted signal with the first phase to get a seventh output signal; subtracting the second added non-linear component from the second shifted signal with the third phase to get an eighth output signal; and adding the seventh output signal and the eighth output signal to obtain the pre-distorted signal.

In an embodiment, performing pre-distortion computation by using the component signals to get a pre-distorted signal to be transmitted to a power amplifier comprises: performing a seventh non-linear computation on the first shifted signal with the first phase, the signal by the first split with the first phase, the signal by the second split with the third phase, to get a seventh non-linear component; performing an eighth non-linear computation on the first shifted signal with the second phase, the signal by the first split with the second phase, the signal by the second split with the fourth phase, to get an eighth non-linear component; performing a ninth non-linear computation on the second shifted signal with the third phase, the signal by the first split with the first phase, the signal by the second split with the third phase, to get a ninth non-linear component; performing a tenth non-linear computation on the second shifted signal with the fourth phase, the signal by the first split with the second phase, the signal by the second split with the fourth phase, to get a tenth non-linear component; subtracting the seventh non-linear component from the first shifted signal with the first phase to get a ninth output signal; subtracting the eighth non-linear component from the first shifted signal with the second phase to get a tenth output signal; subtracting the ninth non-linear component from the second shifted signal with the third phase to get a eleventh output signal; subtracting the tenth non-linear component from the second shifted signal with the fourth phase to get a twelfth output signal; adding the ninth output signal and the tenth output signal to obtain a third added signal; adding the eleventh output signal and the twelfth output signal to obtain a fourth added signal; and combining the third added signal and the fourth added signal to form the pre-distorted signal.

Figure 7:
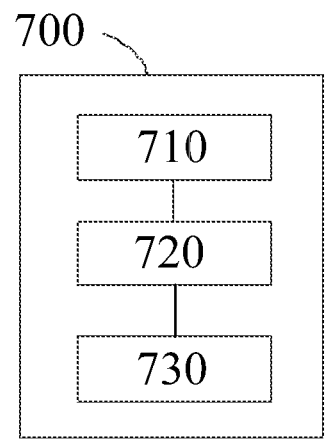
FIG. 7 shows a block diagram illustrating an example apparatus 700 for optimizing digital pre-distortion according to an embodiment of the present disclosure.

FIG. 7 shows a block diagram illustrating an example apparatus 700 for optimizing digital pre-distortion according to an embodiment of the present disclosure. Apparatus 700, for example, may be at least part of the network device in above examples.

As shown in FIG. 7, the example apparatus 700 may include means 710 for performing the step 110 of the example method 100, means 720 for performing the step 120 of the example method 100, means 730 for performing the step 130 of the example method 100. In one or more another example embodiment, at least one I/O interface, at least one antenna element, and the like may also be included in the example apparatus 700.

In some example embodiments, examples of means in the example apparatus 700 may include circuitries. For example, an example of means 710 may include a circuitry configured to perform the step 110 of the example method 100, an example of means 720 may include a circuitry configured to perform the step 120 of the example method 100, and an example of means 730 may include a circuitry configured to perform the step 130 of the example method 100 In some example embodiments, examples of means may also include software modules and any other suitable function entities.

The term "circuitry" throughout this disclosure may refer to one or more or all of the following: (a) hardware-only circuit implementations (such as implementations in only analog and/or digital circuitry); (b) combinations of hardware circuits and software, such as (as applicable) (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to one or all uses of this term in this disclosure, including in any claims. As a further example, as used in this disclosure, the term circuitry also covers an implementation of merely a hardware circuit or processor (or multiple processors) or portion of a hardware circuit or processor and its (or their) accompanying software and/or firmware. The term circuitry also covers, for example and if applicable to the claim element, a baseband integrated circuit or processor integrated circuit for a mobile device or a similar integrated circuit in server, a cellular network device, or other computing or network device.

Another example embodiment may relate to computer program codes or instructions which may cause an apparatus to perform at least respective methods described above. Another example embodiment may be related to a computer readable medium having such computer program codes or instructions stored thereon. In some embodiments, such a computer readable medium may include at least one storage medium in various forms such as a volatile memory and/or a non-volatile memory. The volatile memory may include, but not limited to, for example, a RAM, a cache, and so on. The non-volatile memory may include, but not limited to, a ROM, a hard disk, a flash memory, and so on. The non-volatile memory may also include, but are not limited to, an electric, a magnetic, an optical, an electromagnetic, an infrared, or a semiconductor system, apparatus, or device or any combination of above.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

As used herein, the term "determine/determining" (and grammatical variants thereof) can include, not least: calculating, computing, processing, deriving, measuring, investigating, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

While some embodiments have been described, these embodiments have been presented by way of example, and are not intended to limit the scope of the disclosure. Indeed, apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. At least one of these blocks may be implemented in a variety of different ways. The order of these blocks may also be changed. Any suitable combination of the elements and actions of some embodiments described above can be combined to provide further embodiments. Accompanying claims and their equivalents are intended to cover such forms or modifications as would fall within the scope and spirit of the disclosure.

Abbreviations used in the description and/or in the figures are defined as follows:

5G fifth generation

ACLR adjacent channel leakage ratio

BS base station gNB next generation NodeB/5G base station

UE user equipment

What is claimed is:

1. A digital signal processing apparatus, comprising:
at least one processor; and
at least one memory comprising computer program code, the at least one memory and the computer program code being configured to, with the at least one processor, cause the digital signal processing apparatus as a network device to perform:
splitting an input signal into two or more split signals with different frequencies, the frequency of each of said split signals being different from other said split signals, wherein splitting an input signal into two or more split signals with different frequencies comprises:
shifting the input signal by a first frequency to get a first shifted signal;
shifting the input signal by a second frequency to get a second shifted signal;
separating the first shifted signal to get a first shifted signal with a first phase and a first shifted signal with a second phase; and
separating the second shifted signal to get a second shifted signal with a third phase and a second shifted signal with a fourth phase;
separating each of the two or more split signals into two or more component signals with different phases; and
performing pre-distortion computation by using the component signals to get a pre-distorted signal to be transmitted to a power amplifier.

2. The digital signal processing apparatus of claim 1, wherein splitting an input signal into two or more split signals with different frequencies comprises:
filtering the first shifted signal to get a first split signal; and
filtering the second shifted signal to get a second split signal,
wherein the first split signal is associated with the first frequency, and the second split signal is associated with the second frequency.

3. The digital signal processing apparatus of claim 2, wherein separating each of the two or more split signals into two or more component signals with different phases further comprises:
separating the first split signal into a signal by a first split with the first phase and a signal by the first split with the second phase; and
separating the second split signal into a signal by a second split with the third phase and signal by the second split with the fourth phase.

4. The digital signal processing apparatus of claim 3, wherein performing pre-distortion computation by using the component signals to get a pre-distorted signal to be transmitted to a power amplifier comprises:
performing a first non-linear computation on the first shifted signal with the first phase, the signal by the first split with the first phase, the signal by the second split with the third phase, the first shifted signal with the second phase, the signal by the first split with the second phase, and the signal by the second split with the fourth phase, to get a first non-linear component;
performing a second non-linear computation on the second shifted signal with the third phase, the signal by the first split with the first phase, the signal by the second split with the third phase, the second shifted signal with the fourth phase, the signal by the first split with the second phase, and the signal by the second split with the fourth phase, to get a second non-linear component;
subtracting the first non-linear component from the first shifted signal with the first phase to get a first output signal;
subtracting the second non-linear component from the second shifted signal with the third phase to get a second output signal; and
adding the first output signal and the second output signal to get the pre-distorted signal.

5. The digital signal processing apparatus of claim 3, wherein performing pre-distortion computation by using the component signals to get a pre-distorted signal to be transmitted to a power amplifier comprises:
performing a third non-linear computation associated with the first phase on the first shifted signal with the first phase, the signal by the first split with the first phase, the signal by the second split with the third phase, the first shifted signal with the second phase, the signal by the first split with the second phase, and the signal by the second split with the fourth phase, to get a third non-linear component;
performing a fourth non-linear computation associated with the second phase on the first shifted signal with the first phase, the signal by the first split with the first phase, the signal by the second split with the third phase, the first shifted signal with the second phase, the signal by the first split with the second phase, and the signal by the second split with the fourth phase, to get a fourth non-linear component;
performing a fifth non-linear computation associated with the first phase on the second shifted signal with the third phase, the signal by the first split with the first phase, the signal by the second split with the third phase, the second shifted signal with the fourth phase, the signal by the first split with the second phase, and the signal by the second split with the fourth phase, to get a fifth non-linear component; and
performing a sixth non-linear computation associated with the second phase on the second shifted signal with the third phase, the signal by the first split with the first phase, the signal by the second split with the third phase, the second shifted signal with the fourth phase, the signal by the first split with the second phase, and the signal by the second split with the fourth phase, to get a sixth non-linear component.

6. The digital signal processing apparatus of claim 5, wherein performing pre-distortion computation by using the component signals to get a pre-distorted signal comprises:
subtracting the third non-linear component from the first shifted signal associated with the first phase to get a third output signal;
subtracting the fourth non-linear component from the first shifted signal associated with the second phase to get a fourth output signal;
subtracting the fifth non-linear component from the second shifted signal associated with the third phase to get a fifth output signal;
subtracting the sixth non-linear component from the second shifted signal associated with the fourth phase to get a sixth output signal;
adding the third output signal and the fifth output signal to obtain a first added signal;
adding the fourth output signal and the sixth output signal to obtain a second added signal; and
combining the first added signal and the second added signal to form the pre-distorted signal.

7. The digital signal processing apparatus of claim 5, wherein performing pre-distortion computation by using the second component signals to get a pre-distorted signal further comprises:
   adding the third non-linear component and the fourth non-linear component to obtain a first added non-linear component;
   adding the fifth non-linear component and the sixth non-linear component to obtain a second added non-linear component;
   subtracting the first added non-linear component from the first shifted signal with the first phase to get a seventh output signal;
   subtracting the second added non-linear component from the second shifted signal with the third phase to get an eighth output signal; and
   adding the seventh output signal and the eighth output signal to obtain the pre-distorted signal.

8. The digital signal processing apparatus of claim 3, wherein performing pre-distortion computation by using the component signals to get a pre-distorted signal to be transmitted to a power amplifier comprises:
   performing a seventh non-linear computation on the first shifted signal with the first phase, the signal by the first split with the first phase, the signal by the second split with the third phase, to get a seventh non-linear component;
   performing an eighth non-linear computation on the first shifted signal with the second phase, the signal by the first split with the second phase, the signal by the second split with the fourth phase, to get an eighth non-linear component;
   performing a ninth non-linear computation on the second shifted signal with the third phase, the signal by the first split with the first phase, the signal by the second split with the third phase, to get a ninth non-linear component;
   performing a tenth non-linear computation on the second shifted signal with the fourth phase, the signal by the first split with the second phase, the signal by the second split with the fourth phase, to get a tenth non-linear component;
   subtracting the seventh non-linear component from the first shifted signal with the first phase to get a ninth output signal;
   subtracting the eighth non-linear component from the first shifted signal with the second phase to get a tenth output signal;
   subtracting the ninth non-linear component from the second shifted signal with the third phase to get an eleventh output signal;
   subtracting the tenth non-linear component from the second shifted signal with the fourth phase to get a twelfth output signal;
   adding the ninth output signal and the tenth output signal to obtain a third added signal;
   adding the eleventh output signal and the twelfth output signal to obtain a fourth added signal; and
   combining the third added signal and the fourth added signal to form the pre-distorted signal.

9. A digital signal processing method performed by a network device, comprising:
   splitting an input signal into two or more split signals with different frequencies, the frequency of each of said split signals being different from other said split signals, wherein splitting an input signal into two or more split signals with different frequencies comprises:
      shifting the input signal by a first frequency to get a first shifted signal;
      shifting the input signal by a second frequency to get a second shifted signal;
      separating the first shifted signal to get a first shifted signal with the first phase and a first shifted signal with the second phase; and
      separating the second shifted signal to get a second shifted signal with the third phase and a second shifted signal with the fourth phase;
   separating each of the two or more split signals into two or more component signals with different phases; and
   performing pre-distortion computation by using the component signals to get a pre-distorted signal to be transmitted to a power amplifier.

10. The digital signal processing method of claim 9, wherein splitting an input signal into two or more split signals with different frequencies comprises:
    filtering the first shifted signal to get a first split signal; and
    filtering the second shifted signal to get a second split signal,
    wherein the first split signal is associated with the first frequency, and the second split signal is associated with the second frequency.

11. The digital signal processing method of claim 10, wherein separating each of the two or more split signals into two or more component signals with different phases further comprises:
    separating the first split signal into a signal by a first split with the first phase and a signal by the first split with the second phase; and
    separating the second split signal into a signal by a second split with the third phase and signal by the second split with the fourth phase.

12. The digital signal processing method of claim 11, wherein performing pre-distortion computation by using the component signals to get a pre-distorted signal to be transmitted to a power amplifier comprises:
    performing a first non-linear computation on the first shifted signal with the first phase, the signal by the first split with the first phase, the signal by the second split with the third phase, the first shifted signal with the second phase, the signal by the first split with the second phase, and the signal by the second split with the fourth phase, to get a first non-linear component;
    performing a second non-linear computation on the second shifted signal with the third phase, the signal by the first split with the first phase, the signal by the second split with the third phase, the second shifted signal with the fourth phase, the signal by the first split with the second phase, and the signal by the second split with the fourth phase, to get a second non-linear component;
    subtracting the first non-linear component from the first shifted signal with the first phase to get a first output signal;
    subtracting the second non-linear component from the second shifted signal with the third phase to get a second output signal; and
    adding the first output signal and the second output signal to get the pre-distorted signal.

13. The digital signal processing method of claim 11, wherein performing pre-distortion computation by using the component signals to get a pre-distorted signal to be transmitted to a power amplifier comprises:
    performing a third non-linear computation associated with the first phase on the first shifted signal with the first phase, the signal by the first split with the first phase, the signal by the second split with the third phase, the first shifted signal with the second phase, the signal by the first split with the second phase, and the signal by the second split with the fourth phase, to get a third non-linear component;

performing a fourth non-linear computation associated with the second phase on the first shifted signal with the first phase, the signal by the first split with the first phase, the signal by the second split with the third phase, the first shifted signal with the second phase, the signal by the first split with the second phase, and the signal by the second split with the fourth phase, to get a fourth non-linear component;

performing a fifth non-linear computation associated with the first phase on the second shifted signal with the third phase, the signal by the first split with the first phase, the signal by the second split with the third phase, the second shifted signal with the fourth phase, the signal by the first split with the second phase, and the signal by the second split with the fourth phase, to get a fifth non-linear component; and performing a sixth non-linear computation associated with the second phase on the second shifted signal with the third phase, the signal by the first split with the first phase, the signal by the second split with the third phase, the second shifted signal with the fourth phase, the signal by the first split with the second phase, and the signal by the second split with the fourth phase, to get a sixth non-linear component.

14. The digital signal processing method of claim 13, wherein performing pre-distortion computation by using the component signals to get a pre-distorted signal comprises:

subtracting the third non-linear component from the first shifted signal associated with the first phase to get a third output signal;

subtracting the fourth non-linear component from the first shifted signal associated with the second phase to get a fourth output signal;

subtracting the fifth non-linear component from the second shifted signal associated with the third phase to get a fifth output signal;

subtracting the sixth non-linear component from the second shifted signal associated with the fourth phase to get a sixth output signal;

adding the third output signal and the fifth output signal to obtain a first added signal;

adding the fourth output signal and the sixth output signal to obtain a second added signal; and combining the first added signal and the second added signal to form the pre-distorted signal.

15. The digital signal processing method of claim 13, wherein performing pre-distortion computation by using the second component signals to get a pre-distorted signal further comprises:

adding the third non-linear component and the fourth non-linear component to obtain a first added non-linear component;

adding the fifth non-linear component and the sixth non-linear component to obtain a second added non-linear component;

subtracting the first added non-linear component from the first shifted signal with the first phase to get a seventh output signal;

subtracting the second added non-linear component from the second shifted signal with the third phase to get an eighth output signal; and adding the seventh output signal and the eighth output signal to obtain the pre-distorted signal.

16. The digital signal processing method of claim 11, wherein performing pre-distortion computation by using the component signals to get a pre-distorted signal to be transmitted to a power amplifier comprises:

performing a seventh non-linear computation on the first shifted signal with the first phase, the signal by the first split with the first phase, the signal by the second split with the third phase, to get a seventh non-linear component;

performing an eighth non-linear computation on the first shifted signal with the second phase, the signal by the first split with the second phase, the signal by the second split with the fourth phase, to get an eighth non-linear component;

performing a ninth non-linear computation on the second shifted signal with the third phase, the signal by the first split with the first phase, the signal by the second split with the third phase, to get a ninth non-linear component;

performing a tenth non-linear computation on the second shifted signal with the fourth phase, the signal by the first split with the second phase, the signal by the second split with the fourth phase, to get a tenth non-linear component;

subtracting the seventh non-linear component from the first shifted signal with the first phase to get a ninth output signal;

subtracting the eighth non-linear component from the first shifted signal with the second phase to get a tenth output signal;

subtracting the ninth non-linear component from the second shifted signal with the third phase to get an eleventh output signal;

subtracting the tenth non-linear component from the second shifted signal with the fourth phase to get a twelfth output signal;

adding the ninth output signal and the tenth output signal to obtain a third added signal;

adding the eleventh output signal and the twelfth output signal to obtain a fourth added signal; and combining the third added signal and the fourth added signal to form the pre-distorted signal.

17. A non-transitory computer readable medium comprising program instructions that, when executed by an apparatus, cause the apparatus to perform at least:

splitting an input signal into two or more split signals with different frequencies, the frequency of each of said split signals being different from other said split signals, wherein splitting an input signal into two or more split signals with different frequencies comprises:

shifting the input signal by a first frequency to get a first shifted signal;

shifting the input signal by a second frequency to get a second shifted signal;

separating the first shifted signal to get a first shifted signal with a first phase and a first shifted signal with a second phase; and separating the second shifted signal to get a second shifted signal with a third phase and a second shifted signal with a fourth phase;

separating each of the two or more split signals into two or more component signals with different phases; and performing pre-distortion computation by using the component signals to get a pre-distorted signal to be transmitted to a power amplifier.

\* \* \* \* \*